United States Patent [19]

Chesley et al.

[11] Patent Number: 5,672,186
[45] Date of Patent: Sep. 30, 1997

[54] METHOD OF MAKING AN ABRASIVE ARTICLE

[75] Inventors: Jason A. Chesley, Hudson, Wis.; Donald R. Bell, White Bear Township, Ramsey County, Minn.; Harold E. Rude, Roseville, Minn.; William F. Sheffield, Oakdale, Minn.; David F. Slama, Vadnais Heights, Minn.; Alan N. Stephens, Warwickshire, United Kingdom

[73] Assignee: Minnesota Mining and Manufacturing Company, St. Paul, Minn.

[21] Appl. No.: 615,126

[22] Filed: Mar. 13, 1996

Related U.S. Application Data

[62] Division of Ser. No. 181,193, Jan. 13, 1994, Pat. No. 5,505,747.

[51] Int. Cl.$^6$ .................................................. B24D 11/00
[52] U.S. Cl. ........................... 51/297; 156/245; 428/100
[58] Field of Search ..................... 51/293, 297; 451/538, 451/490; 156/245; 24/452, 575; 428/100

[56] References Cited

U.S. PATENT DOCUMENTS

| | | | |
|---|---|---|---|
| 2,717,437 | 9/1955 | De Mestral | 28/72 |
| 2,958,593 | 11/1960 | Hoover et al. | 51/295 |
| 3,009,235 | 11/1961 | De Mestral | 28/78 |
| 3,027,595 | 4/1962 | Takai et al. | 18/10 |
| 3,138,841 | 6/1964 | Naimer | 24/204 |
| 3,147,528 | 9/1964 | Erb | 24/204 |
| 3,192,589 | 7/1965 | Pearson | 24/204 |
| 3,235,438 | 2/1966 | Wisotzky | 161/62 |
| 3,270,408 | 9/1966 | Nealis | 29/408 |
| 3,312,583 | 4/1967 | Rochlis | 161/62 |
| 3,320,649 | 5/1967 | Naimer | 28/72 |
| 3,353,663 | 11/1967 | Kayser et al. | 206/59 |
| 3,408,705 | 11/1968 | Kayser et al. | 24/204 |
| 3,490,107 | 1/1970 | Brumlik | 24/204 |
| 3,494,006 | 2/1970 | Brumlik | 24/204 |
| 3,522,637 | 8/1970 | Brumlik | 24/204 |
| 3,555,601 | 1/1971 | Price | 18/10 |
| 3,594,863 | 7/1971 | Erb | 18/5 |
| 3,594,865 | 7/1971 | Erb | 18/5 |
| 3,708,833 | 1/1973 | Ribich et al. | 24/204 |
| 3,718,725 | 2/1973 | Hamano | 264/163 |
| 3,762,000 | 10/1973 | Menzin et al. | 24/204 |
| 3,773,580 | 11/1973 | Provost | 156/66 |
| 3,849,840 | 11/1974 | Yamada et al. | 24/204 |
| 3,849,949 | 11/1974 | Steinhauser et al. | 51/406 |
| 3,863,304 | 2/1975 | Brumlik | 24/204 |
| 3,913,183 | 10/1975 | Brumlik | 24/204 |
| 4,024,003 | 5/1977 | Buhler | 156/148 |
| 4,056,593 | 11/1977 | de Navas Albareda | 264/145 |
| 4,064,018 | 12/1977 | Choi | 201/12 |
| 4,147,580 | 4/1979 | Buell | 156/291 |
| 4,169,303 | 10/1979 | Lemelson | 24/204 |
| 4,184,291 | 1/1980 | Marton | 51/170 |
| 4,216,257 | 8/1980 | Schams et al. | 428/93 |
| 4,263,755 | 4/1981 | Globus | 51/358 |
| 4,287,685 | 9/1981 | Marton | 51/170 |
| 4,290,174 | 9/1981 | Kalleberg | 24/204 |
| 4,290,832 | 9/1981 | Kalleberg | 156/72 |
| 4,315,885 | 2/1982 | Lemelson | 264/297 |
| 4,322,875 | 4/1982 | Brown et al. | 24/204 |
| 4,410,327 | 10/1983 | Baggaley | 604/391 |
| 4,437,269 | 3/1984 | Shaw | 51/358 |
| 4,454,183 | 6/1984 | Wollman | 428/92 |
| 4,563,380 | 1/1986 | Black et al. | 428/100 |
| 4,609,581 | 9/1986 | Ott | 428/100 |
| 4,644,703 | 2/1987 | Kaczmarek et al. | 51/401 |
| 4,653,582 | 3/1987 | Ehrenfried | 116/222 |
| 4,665,909 | 5/1987 | Trainor | 128/155 |
| 4,699,622 | 10/1987 | Toussant et al. | 604/389 |
| 4,706,914 | 11/1987 | Ground | 248/74.3 |
| 4,707,893 | 11/1987 | Hashizume et al. | 24/446 |
| 4,710,414 | 12/1987 | Northrup et al. | 428/43 |
| 4,761,318 | 8/1988 | Ott et al. | 428/85 |
| 4,775,310 | 10/1988 | Fischer | 425/308 |
| 4,784,890 | 11/1988 | Black | 428/100 |
| 4,814,036 | 3/1989 | Hatch | 156/245 |
| 4,819,309 | 4/1989 | Behymer | 24/576 |
| 4,822,658 | 4/1989 | Pacione | 428/95 |
| 4,870,725 | 10/1989 | Dubowik | 24/442 |
| 4,872,243 | 10/1989 | Fischer | 24/442 |
| 4,875,259 | 10/1989 | Appeldorn | 24/576 |
| 4,881,997 | 11/1989 | Hatch | 156/66 |
| 4,894,060 | 1/1990 | Nestegard | 604/391 |
| 4,897,891 | 2/1990 | Kallman et al. | 5/493 |
| 4,910,062 | 3/1990 | Zinke et al. | 428/95 |
| 4,931,343 | 6/1990 | Becker et al. | 428/95 |
| 4,933,224 | 6/1990 | Hatch | 428/100 |
| 4,959,265 | 9/1990 | Wood et al. | 428/343 |
| 4,974,384 | 12/1990 | Pacione | 52/483 |
| 4,984,339 | 1/1991 | Provost et al. | 24/452 |
| 5,032,122 | 7/1991 | Noel et al. | 604/391 |
| 5,040,275 | 8/1991 | Eckhardt et al. | 24/447 |
| 5,042,221 | 8/1991 | Pacione | 52/749 |
| 5,054,245 | 10/1991 | Coty | 51/170 |
| 5,056,933 | 10/1991 | Kamp | 383/63 |
| 5,058,247 | 10/1991 | Thomas et al. | 24/448 |
| 5,060,443 | 10/1991 | Pacione | 52/506 |

(List continued on next page.)

FOREIGN PATENT DOCUMENTS

| | | | |
|---|---|---|---|
| 0 211 564 | 2/1987 | European Pat. Off. | A44B 18/00 |
| 0 258 015 | 3/1988 | European Pat. Off. | A44B 18/00 |

(List continued on next page.)

OTHER PUBLICATIONS

Dominick V. Rosato, PE and Donald V. Rosato, PhD (eds), *Injection Molding Handbook*, pp. 504–506, 596, 619–621, 752–754, and 756; Van Nostrand Reinhold Company, New York, 1986.

Primary Examiner—Deborah Jones
Attorney, Agent, or Firm—Gary L. Griswold; Walter N. Kirn; James J. Trussell

[57] ABSTRACT

A method for making an abrasive article is disclosed, including the steps of providing a substrate having abrasive means on one surface, and providing a plurality of hooking stems on the opposite surface thereof. Several illustrative variations of the inventive method are disclosed.

32 Claims, 3 Drawing Sheets

U.S. PATENT DOCUMENTS

| | | | |
|---|---|---|---|
| 5,066,444 | 11/1991 | Behr | 264/171 |
| 5,067,210 | 11/1991 | Kayaki | 24/452 |
| 5,067,822 | 11/1991 | Wirth et al. | 383/61 |
| 5,077,870 | 1/1992 | Melbye et al. | 24/452 |
| 5,088,164 | 2/1992 | Wilson et al. | 24/576 |
| 5,100,400 | 3/1992 | Mody et al. | 604/391 |
| 5,107,626 | 4/1992 | Mucci | 51/281 R |
| 5,110,649 | 5/1992 | Morse et al. | 428/100 |
| 5,116,563 | 5/1992 | Thomas et al. | 264/167 |
| 5,133,166 | 7/1992 | Pacione | 52/483 |
| 5,138,750 | 8/1992 | Gundlach et al. | 24/587 |
| 5,144,786 | 9/1992 | Pacione | 52/747 |
| 5,149,573 | 9/1992 | Kobe et al. | 428/93 |
| 5,174,795 | 12/1992 | Wiand | 51/295 |
| 5,175,965 | 1/1993 | Sanborn | 51/293 |
| 5,180,618 | 1/1993 | Kessler et al. | 428/100 |
| 5,191,692 | 3/1993 | Pacione | 29/423 |
| 5,196,266 | 3/1993 | Lu et al. | 428/355 |
| 5,201,101 | 4/1993 | Rouser et al. | 24/575 |
| 5,201,147 | 4/1993 | Francis | 451/461 |
| 5,201,149 | 4/1993 | Eisenblätter | 51/394 |
| 5,230,851 | 7/1993 | Thomas | 264/145 |
| 5,231,803 | 8/1993 | Lanzer | 51/325 |
| 5,242,646 | 9/1993 | Torigoe et al. | 264/219 |
| 5,254,194 | 10/1993 | Ott et al. | 156/176 |
| 5,318,741 | 6/1994 | Thomas | 264/519 |
| 5,505,747 | 4/1996 | Chesley et al. | 51/297 |

FOREIGN PATENT DOCUMENTS

| | | | |
|---|---|---|---|
| 0 276 970 | 8/1988 | European Pat. Off. | A41B 13/02 |
| 0 319 249 | 6/1989 | European Pat. Off. | A41B 13/02 |
| 0 341 993 A1 | 11/1989 | European Pat. Off. | A44B 18/00 |
| 0 554 668 A1 | 8/1993 | European Pat. Off. | B24D 11/00 |
| 0 575 828 A1 | 12/1993 | European Pat. Off. | A44B 18/00 |
| 0 578 865 | 1/1994 | European Pat. Off. | B24D 3/00 |
| 32 44 410 A1 | 10/1983 | Germany | A44B 18/00 |
| OS 39 03 204 | 2/1990 | Germany | B24D 11/02 |
| 42 41 908 | 6/1993 | Germany | B24D 9/08 |
| 49-38734 | 4/1974 | Japan . | |
| 53-22501 | 3/1978 | Japan | C10B 49/22 |
| 1199940 | 7/1970 | United Kingdom | B24D 9/00 |
| 1205267 | 9/1970 | United Kingdom | B24D 9/08 |
| 1413386 | 11/1975 | United Kingdom | A44B 13/00 |
| WO86/03164 | 6/1986 | WIPO | B32B 3/06 |
| WO87/06522 | 5/1987 | WIPO | B29C 39/36 |
| WO92/01401 | 2/1992 | WIPO | A44B 18/00 |
| WO93/03644 | 3/1993 | WIPO | A44B 18/00 |
| WO93/03889 | 3/1993 | WIPO | B24D 3/00 |
| WO93/20976 | 10/1993 | WIPO | B24D 3/00 |

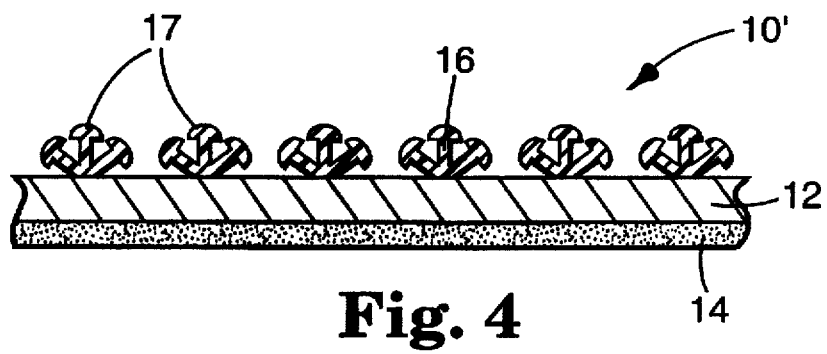
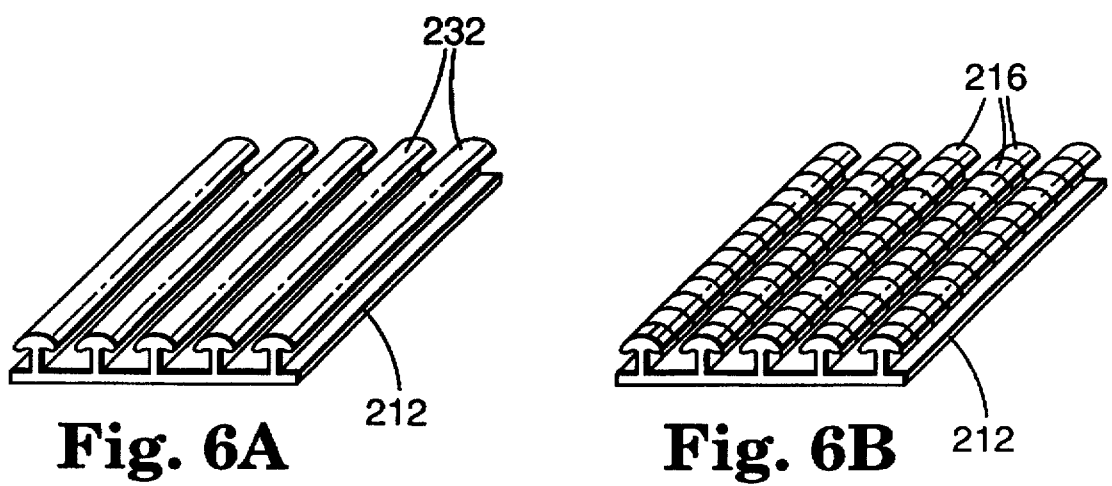

METHOD OF MAKING AN ABRASIVE ARTICLE

This is a division of application Ser. No. 08/181,193 filed Jan. 13, 1994, now U.S. Pat. No. 5,505,747.

TECHNICAL FIELD

The invention relates to a method of making a coated abrasive article, such as an abrasive disc or an abrasive sheet.

BACKGROUND OF THE INVENTION

Abrasive articles are used in a variety of fields for abrading material from a surface of a workpiece. For example, an abrasive disc may be releasably mounted on a back-up pad for rotative movement by a random orbital sander. When the disc is rotated, and the exposed abrasive surface of the disc is urged against the workpiece surface, material may be removed from the workpiece. This operation may be desirable for surface refinement purposes, or for the removal of excess material from the workpiece.

Abrasive discs are typically releasably attached to a back-up pad, which supports the abrasive disc during the abrading process. Several types of abrasive discs have some type of attachment system incorporated into the disc to enable the disc to be releasably attached to a back-up pad. For example, abrasive discs having a layer of pressure sensitive adhesive ("PSA") on the back surface (the surface opposite the abrasive surface) are typically made by applying a layer of pressure sensitive adhesive on the back surface of the disc. One method used to produce these PSA abrasive discs is described in U.S. Pat. No. 3,849,949 (Steinhauser et al.), wherein adhesives such as vinyl ethers, acrylates, rubber resins, acrylic copolymers (such as a 95.5:4.5 isooctylacrylate:acrylic acid copolymer) are coated onto an abrasive sheet. The PSA is then dried or cooled, such that it is tacky but not flowable.

Although the foregoing process is useful, certain disadvantages are evident. For example, the PSA layer thickness (known in the processing field as the "coating weight") is often critical to the performance of the PSA abrasive disc, and precise control of the coating weight may be difficult to obtain by conventional coating methods. Furthermore, uniformity of PSA coating is also important to adhesion, and may be similarly difficult to obtain. Non-uniform PSA coating can lead to lack of adhesion (where PSA coating weight is reduced) or bumps in the surface of the abrasive disc (where PSA coating weight is increased). These potential disadvantages can be undesirable.

Another type of abrasive disc includes a textile material on the back surface of the disc. Abrasive discs of this type are disclosed in U.S. Pat. Nos. 4,437,269 (Shaw) and 4,609,581 (Ott), and an example of a textile abrasive disc is available from the Minnesota Mining and Manufacturing Company of St. Paul, Minn. under the designation Hookit™ discs. Textile discs are typically used in conjunction with a back-up pad having a plurality of engaging members that are bonded to the attachment surface of the back-up pad. The engaging members on the back-up pad are designed to engage the textile material of the textile disc, to secure the abrasive disc to the back-up pad.

The method of making a textile abrasive disc generally includes the steps of providing a loop material (such as a brushed nylon material available from Guilford Mills, Inc., of Greensboro, N.C. under the designation 33295), and laminating the loop material to an abrasive sheet using a suitable (for the textile or abrasive sheet member) water-based, solvent-based, or 100% solids hot-melt adhesive. The laminating adhesive is normally roll coated, sprayed, or extruded onto the abrasive sheet backing, and the loop material is then applied to the adhesive surface.

This method produces an acceptable abrasive disc, but certain disadvantages may again be evident. For example, suitable textiles are generally expensive, especially when compared to pressure sensitive adhesives. Also, the textile material often requires an added brushing step to provide a sufficient number of loops in an upright position to facilitate adequate attachment. Furthermore, the converting of textile-backed abrasive members to disc form requires unique equipment, such as high pressure presses and special handling apparatuses to collate the cut abrasive discs properly for packaging. Placement of the textile material onto the adhesive surface of an abrasive sheet may also be problematical, because the textile must be maintained in correct alignment with the adhesive-applied abrasive sheet member to prevent wrinkles in either the textile or abrasive sheet member.

The '269 patent referenced above also discloses a third type of abrasive disc. This type of disc, referred to herein as the "stalk disc," includes a plurality of engaging members in the form of inclined stalks. The stalks have unhooked ends, which slidingly intermesh with a textile material on a back-up pad to secure the abrasive disc to the back-up pad. The method used to make stalk discs generally involves a knitting process (such as warp knitting), that produces a woven base layer formed from multifilament yarn. Spaced stalks are woven into the knitted base layer, and are inclined with respect to, and project away from, the base layer. The woven stalk material may then be laminated to an abrasive sheet to produce an abrasive article.

Although stalk discs have some utility, the method used to produce such discs has certain disadvantages. The raw materials used to make stalk discs are more expensive than, for example, pressure sensitive adhesive materials. Other difficulties may arise during the converting process, such as damage to the stalks, lamination problems due to handling of the stalk fabric, and the like.

In view of the disadvantages associated with the various abrasive disc manufacturing methods of the prior art, it is desirable to provide a method of making an abrasive disc that overcomes those disadvantages.

SUMMARY OF THE INVENTION

The present invention includes a method of making an abrasive article, including the steps of providing an abrasive sheet having first and second major surfaces, the first major surface including means for abrading a surface; providing a plurality of projecting stems on said second surface; and providing each stem with a hooking portion to enable the hooking stem to releasably hook an opposed engaging structure.

In another embodiment, the method comprises the steps of providing an abrasive sheet having first and second major surfaces, the first major surface including means for abrading a surface; molding a base sheet having opposed first and second major surfaces, and a plurality of stems projecting from the first major surface; bonding the second major surface of the base sheet to the second major surface of the abrasive sheet; and providing each stem with a hooking portion to enable the hooking stem to releasably hook an opposed engaging structure.

In another embodiment, the method comprises the steps of providing an abrasive sheet having first and second major surfaces, the first major surface including means for abrading a surface; providing a plurality of stems projecting from the second major surface by the application of a flowable material with a gravure roll; and providing each stem with a hooking portion to enable the hooking stem to releasably hook an opposed engaging structure.

In yet another embodiment, the method includes the steps of providing an abrasive sheet having first and second major surfaces, the first major surface including means for abrading a surface; extruding a flowable material through a die opening adapted to provide a base sheet having a plurality of parallel rail members projecting therefrom; severing the rail members transverse to the longitudinal axis of the rail members; stretching the base sheet to space the severed portions of the respective rail members to provide hooking stems; and bonding the base sheet to the abrasive sheet to provide the abrasive article.

Variations on the foregoing methods are also disclosed, as well as an abrasive article made by any one of the various methods disclosed.

BRIEF DESCRIPTION OF THE DRAWINGS

The present invention will be further explained with reference to the appended Figures, wherein like structure is referred to by like numerals throughout the several views, and wherein:

FIG. 4 is a sectional view of an abrasive article having hooking stems arranged in a plurality of clusters;

FIGS. 6A and 6B are perspective views of a base sheet during two stages of the process illustrated in FIG. 6.

DETAILED DESCRIPTION OF THE INVENTION

Figure 1:
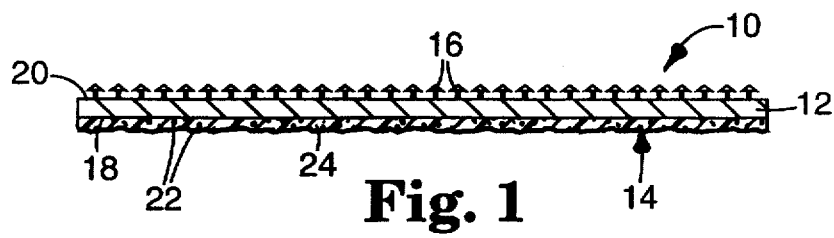
FIG. 1 is a sectional view of an abrasive article according to the method of the present invention.

The present invention provides a method for making an abrasive article having hooking stems on one major surface thereof. The abrasive article is described in greater detail in copending U.S. patent application Ser. No. 08/191,192, entitled "Abrasive Article," filed Jan. 13, 1994 and commonly assigned to the assignee of the present invention, the contents of which is incorporated by reference herein. The method, which will be described in greater detail below, generally includes the steps of providing an abrasive substrate having first and second major surfaces, the first major surface including means for abrading a surface, providing a plurality of stems adjacent and projecting from said second surface, and providing each stem with a hooking portion to enable the hooking stem to releasably hook an opposed engaging structure.

With regard to the abrasive article produced by the method of the present invention, reference is made to FIGS. 1 through 4. Abrasive article 10 includes a substrate 12 having first and second major surfaces 18 and 20. First major surface 18 includes abrasive means 14 for abrading a surface, which are shown in the illustrate embodiment as abrasive particles 22 dispersed within bonding layer 24. The second major surface 20 includes a plurality of hooking stems 16, each of which includes hooking means for hooking engaging structures of an opposed surface.

Substrate 12 includes first and second major surfaces 18 and 20, respectively. The substrate of the present invention may comprise one or more of several different materials, including but not limited to fabric or cloth, paper, polymeric film, vulcanized fiber, woven or nonwoven webs, and treated film, versions, or combinations thereof. It is specifically contemplated that the substrate of the abrasive article may comprise an abrasive sheet laminated to a base sheet, as described further hereinafter. A preferred substrate is a primed polyester film, which is available from the Imperial Chemical Industries Americas Inc., of Wilmington, Del. under the designation ICI-475 film.

First major surface 18 of substrate 12 includes means for abrading a surface. In the illustrated embodiment, abrasive means is shown as abrasive particles 22 that are bonded to the first major surface 18 by a bonding material 24. The abrasive particles can include, but are not limited to, garnet, emery, aluminum oxide, cubic boron nitride, silicon carbide, alumina-zirconia, diamond, ceramic aluminum oxide, and combinations thereof. Typical bonding materials include animal glue and synthetic resins. Materials such as grinding aids, fillers, dyes, pigments, fibers, lubricants, surfactants, antistatic agents, coupling agents, plasticizers, and suspending agents may also be added to the abrasive materials.

Nonwoven abrasive products incorporating abrasive grains may also be used as abrasive means in conjunction with the present invention. Nonwovens typically comprise an open porous lofty polymer filament structure (substrate) having the abrasive grains distributed throughout the fiber structure and bonded therein by an organic binder. Typical fibrous filaments structures applicable to such constructions comprise polyamides, polyesters, and polypropylene. Nonwoven abrasives are well known in the art—see, for example, U.S. Pat. No. 2,958,593 (Hoover et al.)—and thus will not be described further herein.

Hooking stems 16 are provided on second major surface 20, as shown in FIG. 1. As used herein, a hooking stem means a stem having 1) a free end that is spaced from the surface to which the stem is attached, and 2) structure that enables the hooking stem to releasably hook engaging structures provided on an opposed surface. Hooking stems 16 may be selected from among numerous different designs, some of which are shown and described herein. It should be understood that other hooking stem designs are comprehended by the present invention, though they are not specifically described below.

Each hooking stem is provided on and projects from the second surface 20. The hooking stems may be directly provided on the second surface 20 by being formed integrally with the second surface 20, or may be provided on an intermediate sheet or layer, which is affixed to the second surface. Stated differently, the hooking stems may or may not be directly bonded to the second surface 20. The hooking stems of the present invention may be provided on the second major surface in one of several ways. For example, the hooking stems may be formed from the same material as the substrate, such that the hooking stems are unitary with the substrate. Alternatively, the hooking stems may be affixed to the second major surface by, for example, an adhesive such as a hot-melt adhesive. In another embodiment, the hooking stems are formed from a separate sheet member (e.g. a plastic sheet), and the sheet member is affixed to the second major surface of the substrate. The separate sheet member may be bonded to the substrate directly (by ultrasonic bonding, for example), or by means of an adhesive. Other layers, including but not limited to an adhesive layer or a primer layer, may also be interposed between the hooking stems and the substrate.

Stem 28 may have any suitable cross-sectional shape, taken parallel to the substrate, including but not limited to a circle, an oval, a polygon (such as a star, a cross, a rectangle, or a parallelogram), or a multi-lobed shape (such as a daisy or a clover). The hooking stems may be solid or hollow, as desired, and the cross-sectional area of the hooking stem taken parallel to the second surface 20 is preferably within the range of 0.002 to 25 square millimeters (0.000004 to 0.04 square inches), more preferably between 0.01 and 1.0 square millimeters (0.000016 to 0.0016 inches), and most preferably between 0.05 and 0.45 square millimeters (0.00008 and 0.0007 square inches). These size ranges are for hooking stems that are adapted for interengagement with a durable loop material.

The maximum diameter of the stem, in the case of a cylindrical stem, is preferably between approximately 0.05 and 5.0 mm (0.002 and 0.20 in), more preferably between approximately 0.13 and 1.0 mm (0.005 and 0.04 in), and most preferably between 0.25 and 0.76 mm (0.01 and 0.03 in). The overall length of the hooking stem is preferably between approximately 0.01 and 10 mm (0.0004 and 0.40 in), more preferably between 0.05 and 2.6 mm (0.002 and 0.102 in), and most preferably between 0.13 and 1.0 mm (0.005 and 0.04 in). It should be noted that hooking stem shapes, diameters, and lengths can be mixed within a given abrasive article, such that the abrasive article comprises hooking stems of more than one shape, diameter, and/or length. Also, the shape, size, and orientation of the hooking stems may be selected to provide a suitable shear strength and peel strength for a given application.

Hooking stems 22 may be straight or arcuate, and may be arranged in a regular array or be randomly distributed across the second major surface. For example, it may be desirable to provide helical hooking stems, and to arrange the hooking stems in parallel, sinusoidal columns. The hooking stem density can be selected as desired, and preferably is between approximately 8.0 and 310 hooking stems per square centimeter (50 and 2000 hooking stems per square inch), although other hooking stem densities can be provided.

The hooking stems 16 may also be arranged in a plurality of clusters, as shown in FIG. 4 at 17. That is, two or more adjacent stems may be placed close to each other in a cluster, with adjacent clusters separated from each other by a distance greater than the distance between the stems within a cluster. The stems within each cluster could be inclined at any suitable orientation, although the stems within each cluster are preferably inclined at different orientations. Furthermore, the clusters could be randomly or uniformly distributed over the surface to which the stems are attached, as suitable to the particular application. Clusters can be provided in a plurality of rows, or stripes, and those rows may be parallel (either straight rows, or curvalinear rows).

The preferred hooking stem material is an organic polymeric material, such as a thermosetting material or a thermoplastic material. Suitable thermoplastic materials include polyurethanes, polyamides, polyolefins (for example, polyethylene and polypropylene), polyesters, and combinations thereof. The hooking stem may also comprise one or more additives, including but not limited to fillers, fibers, antistatic agents, lubricants, wetting agents, surfactants, pigments, dyes, coupling agents, plasticizers, and suspending agents. It is also contemplated that different portions of each of the hooking stems may be made from different materials discussed above.

Figure 2A:
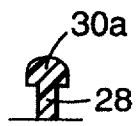
FIGS. 2(a) through 2(n) are sectional views of several embodiments of hooking stems according to the present invention.
Figure 2B:
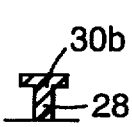
Figure 2C:
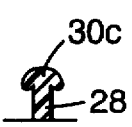
Figure 2D:
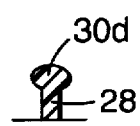
Figure 2E:
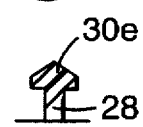
Figure 2F:
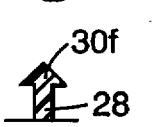
Figure 2G:
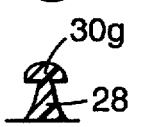
Figure 2H:
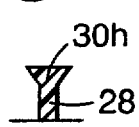
Figure 2I:
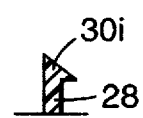
Figure 2J:
Figure 2K:
Figure 2L:
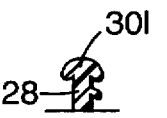
Figure 2M:
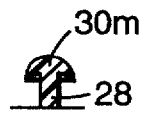
Figure 2N:
Figure 3A:
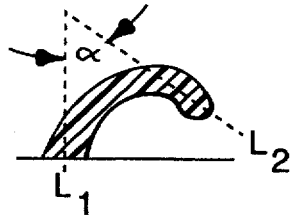
FIGS. 3(a) through 3(d) are sectional views of several additional embodiments of hooking stems according to the present invention.
Figure 3B:
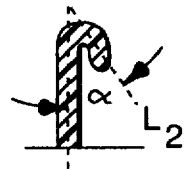
Figure 3C:
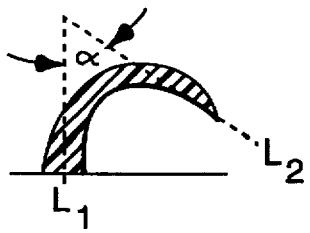
Figure 3D:
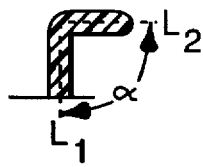

The hooking stems discussed above also include means for hooking an engaging structure on an opposed surface (such as a loop material) to releasably affix the abrasive article to the opposed surface. In one embodiment, the hooking means is shown as at least one head 30 (shown as heads 30a through 30n in the illustrated embodiments) provided on each stem, as shown in the side views illustrated in FIGS. 2(a) through 2(n). Head 30 may also, or instead, be provided at other locations along stem 28, as shown in FIGS. 2(k) and 2(l), for example. A head, as used herein, means any structure that extends radially beyond the periphery of the stem in at least one direction.

Head 30 may have any suitable three-dimensional shape, such as, for example, a hemisphere, a sphere, a cube, a mushroom cap, a cylinder, a cone, a pyramid, a disc, or a barb. Some head designs thought to have utility in the context of the present invention are shown in FIG. 2. It is preferred, although not required, that the head have at least one undercut portion that extends away from the stem at approximately a 90 degree angle, such as the heads shown in FIGS. 2(a), 2(b), 2(e), 2(f), 2(g), 2(i), 2(j), and 2(k), to hook the engaging members of an opposed mating surface. It is also possible to provide a head having portions that extend toward the base of the stem, creating an "underhang" portion of the head. In other embodiments, each stem is provided with two or more heads, the shape of which may be selected as desired.

The length of head 30 is preferably between approximately 0.05 mm and 2.0 mm (0.002 and 0.079 in), and is more preferably between approximately 0.1 and 1.1 mm (0.004 and 0.045 in), measured from the first point at which the head portion departs from the stem to the point most distant therefrom. These size ranges are for hooking stems that are adapted for interengagement with a durable loop material.

The size of the portion of the head that extends radially beyond the stem can be important for insuring proper engagement and disengagement of the abrasive article and the opposed surface. If the head extends radially beyond the stem for too little a distance, the disengagement force between the abrasive article and the opposed surface may be insufficient. Conversely, if the head extends beyond the stem for too great a distance, the heads may not engage with the opposed surface, or if a sufficient number of heads engage, the disengagement force may be greater than is desired. Thus, it is preferred that the maximum head diameter exceed the stem diameter by at least approximately 0.05 mm (0.002 in), but not by more than approximately 1.5 mm (0.06 in).

The hooking stems are preferably generally perpendicular to the second surface, although the hooking stems may be inclined with respect to the second surface if desired. Also, it may be desirable to provide heads at either a predetermined orientation or at a random orientation relative to each adjacent head, to increase the disengagement force associated with the disc. In addition, for an abrasive article such as a disc to remain firmly attached to a mating surface while in use, it is preferred that if the heads on the hooking stems are provided on only one side of the stem (known as a "directional" hooking stem), then the heads on the hooking stems should not all have the same orientation.

In another embodiment, the hooking means of the present invention comprises hooking stems having an included distal end angle of less than approximately 90 degrees, as shown in FIGS. 3(a) through 3(d). The included distal end angle, which is illustrated by the symbol α in FIG. 3, is defined as the included angle between a straight line perpendicular to the second major surface at the proximal end of the hooking stem (line $L_1$ in FIG. 3) and a straight line extending through and concentric with the distal end of the hooking stem (line $L_2$ in FIG. 3). When angle α is less than approximately 90 degrees, the distal end of each hooking stem is adapted to hook an engaging structure of an opposed surface, and yet may be released from that structure by an appropriate tensile force. Hooking stems constructed in accordance with this embodiment may also include a head of the type described with reference to FIG. 2, above, but a head is not required due to the specified distal end angle of the hooking stems.

Abrasive articles according to the present invention may be attached to surfaces, such as a back-up pad, having any suitable engaging structures, such as fibers, filaments (such as brushed nylon and brushed polyester), woven and non-woven fabrics, knitted fabric, and stitch-bonded fabrics. Other applications are also contemplated, such as attachment to foam (particularly open-cell foam) or to a compatible set of engaging hooks.

The method of the present invention may be practiced in numerous ways, some of which are specifically described and illustrated herein to facilitate a complete understanding of the invention. It should be borne in mind with regard to each of the illustrated embodiments that although the projecting stems 16 are shown as spaced apart, and comparatively tall relative to the thickness of the substrate, the hooking stems are typically on the order of 0.01 to 10.0 cm (0.0004 to 0.4 in) in length, and are typically provided at a density of approximately 8 to 310 hooking stems per square centimeter (50 to 2000 stems per square inch).

The hooking stems of the inventive method are preferably formed by a process requiring the addition of energy (in the form of heat or radiation, for example) to a formed thermoplastic or thermosetting resin. This process is believed to have utility in forming hooking stems having either heads or included distal end angles of less than approximately 90 degrees, and stands in contrast to the textile manufacturing methods of the prior art.

Figure 5:
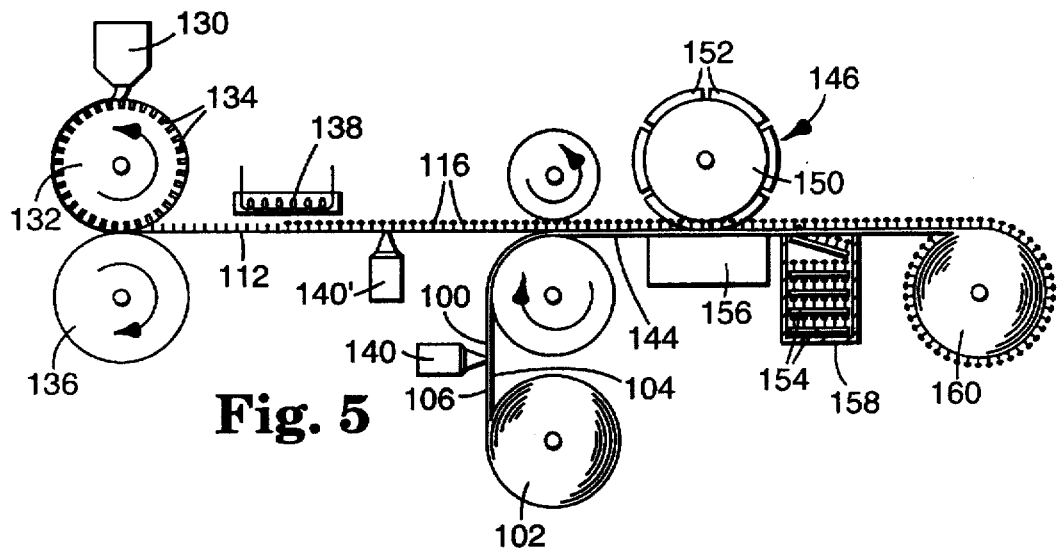
FIG. 5 is a schematic illustration of an apparatus and process for carrying out the method of the present invention.

FIG. 5 illustrates one embodiment of an apparatus and process for carrying out the method of the present invention. Abrasive sheet 100 is provided, preferably in a roll 102, which sheet includes first and second major surfaces 104 and 106. First major surface 104 includes means for abrading a surface, including but not limited to a coated abrasive, a structured coated abrasive, a lapping coated abrasive, or a non-woven abrasive.

Also provided is a base sheet 112, including a plurality of projecting stems 116. In the illustrated embodiment, the base sheet 112 is provided by a process such as that disclosed in U.S. patent application Ser. No. 08/048,874, entitled "Mushroom-Type Hook Strip For A Mechanical Fastener", filed Apr. 18, 1992 and assigned to the assignee of the present invention, the contents of which is hereby incorporated by reference herein.

As illustrated schematically in FIG. 5, the process includes an extruder 130 adapted for extruding a flowable material, such as a thermoplastic resin, onto a mold 132. The surface of the mold includes a plurality of arranged cavities 134, which are adapted to form a like plurality of stems from the flowable material. The cavities 134 may be arranged, sized, and shaped as required to form a suitable stem structure from the flowable material. Typically, a sufficient additional quantity of flowable material is extruded onto mold 132 to form base sheet 112 concurrently. Mold 132 is rotatable and forms a nip, along with opposed roll 136. The nip between mold 132 and opposed roll 136 assists in forcing the flowable material into the cavities of the mold, and provides a uniform base sheet 112. The temperature at which the foregoing process is carried out depends on the particular material used. For example, the temperature is in the range of 230° to 290° C. (446° to 554° F.) for a random copolymer of polypropylene available from the Shell Oil Company of Houston, Tex., under the designation WRS6-165.

The mold may be of the type used for either continuous processing (such as a tape, a cylindrical drum, or a belt), or batch processing (such as an injection mold), although the former is preferred. The cavities of the mold may be formed in any suitable manner, such as by drilling, machining, laser machining, water jet machining, casting, die punching, or diamond turning. The mold cavities should be designed to facilitate release of the stems therefrom, and thus may include angled side walls, or a release coating (such as Teflon™) on the cavity walls. The mold surface may also include a release coating thereon to facilitate release of the base sheet from the mold.

The mold can be made from suitable materials that are rigid or flexible. The mold components can be made of metal, steel, ceramic, polymeric materials (including both thermosetting and thermoplastic polymers) or combinations thereof. The materials forming the mold must have sufficient integrity and durability to withstand the thermal energy associated with the particular molten metal or thermoplastic material used to form the base sheet and hooking stems. In addition, the material forming the mold preferably allows for the cavities to be formed by various methods, is inexpensive, has a long service life, consistently produces material of acceptable quality, and allows for variations in processing parameters.

In the illustrated embodiment, the stems projecting from base sheet are not provided with hooking means (e.g. heads adjoining the stems, or an included distal end angle of less than approximately 90 degrees) at the time the base sheet leaves the mold 132. Hooking means are provided in the illustrated embodiment, in the form of a head adjoining each stem, by heating the stems with a heated plate 138 to thereby deform the distal end of the stem, but may also be provided by contacting the distal ends of the stems with a heated calendering roller to form the heads. Other heating means are contemplated, including but not limited to convective heating by hot air, radiative heating by heat lamp or heated wire, and conductive heating by heated roll or plate.

Abrasive sheet 100 and base sheet 112 are bonded together to form the abrasive article of the invention by using, for example, an adhesive applied to one or both of the sheets at 140 and 140'. The abrasive sheet and the base sheet, in this and other embodiments, together form a laminate which is the substrate of the inventive abrasive article. The adhesive may comprise, for example, acrylic pressure sensitive adhesive, rubber-based PSA, waterborne lattices, solvent-based adhesives, radiation cured adhesives, and two-part resins (e.g. epoxies, polyesters, or polyurethanes). Other bonding means may also be used, including but not limited to heating the base sheet 112 to facilitate adhesion between the base sheet and the abrasive sheet 100, or corona treating either or both of the abrasive sheet 100 or the base sheet 112 to enable reciprocal bonding. The base sheet and the abrasive sheet may be laminated together using pressure (at a nip roller, for example) to form the abrasive article.

Following lamination, the abrasive sheet material 144 is conveyed to converting station 146. Converting station 146, in the illustrated embodiment, includes rotary die cutting apparatus 150, including die portions 152 adapted to cut abrasive articles 154 from sheet material 144. Cutting surface 156 supports the sheet material 144 during cutting, and the abrasive articles 154 may be collected in, for example, bin 158. Other converting station structures are also within the scope of the present invention, and may comprise, for example, a batch die cutting apparatus or the like. The individual abrasive articles may be connected together and collected on a roll, in the manner described in U.S. Pat. No. 3,849,949 (Steinhauser et al.), or may be cut into discrete abrasive articles as shown. The scrap sheet material may be collected on a roll 160, for disposal or further processing.

Figure 6:
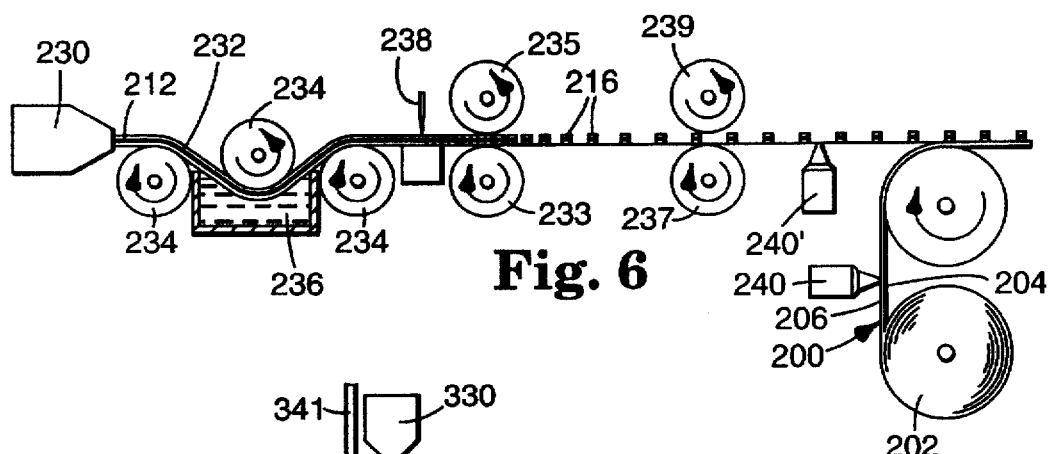
FIG. 6 is a schematic illustration of a second apparatus and process for carrying out the method of the present invention.

A second embodiment of an apparatus and process for carrying out the method of the present invention is shown in FIG. 6. Abrasive sheet 200 is provided, preferably in a roll 202, which sheet includes first and second major surfaces 204 and 206. First major surface 204 includes means for abrading a surface, which may include, for example, a coated abrasive, a structured coated abrasive, a lapping coated abrasive, or a non-woven abrasive.

A base sheet 212 is provided by a process such as that disclosed in U.S. Pat. No. 4,894,060 (Nestegard), the contents of which is hereby incorporated by reference herein. As illustrated schematically in FIG. 6, the base sheet 212 is extruded by an extruding apparatus 230, and includes a plurality of rail members 232 projecting therefrom. An exemplary extruded base sheet 212 is illustrated in FIG. 6A. The rail members 232 may have any suitable cross-sectional shape, taken perpendicular to the base sheet, and preferably have a cross-sectional shape similar to one of the side views shown in FIG. 2. Adjacent rail members should be at least about 0.50 mm (0.02 in) on center, and preferably between 1.1 to 2.8 mm (0.045 to 0.11 in) on center, when the hooking stems will engage a durable loop material. The die openings of the extruder substantially determine the profile of the rail members, and the die openings may be formed in the extruder by any suitable process, such as electron discharge machining. The material from which the base sheet and rail members are made may be any suitable material, such as a thermoplastic resin.

The base sheet 212 is wound around rollers 234 through a quench tank 236 filled with a cooling medium, such as water, after which the rail members are transversely cut at spaced locations along their lengths by cutting apparatus 238. Cutting apparatus 238 may be, for example, a reciprocating or rotating knife, a hot wire, a collimated water jet, or other suitable cutting means. FIG. 6B illustrates the base sheet 212 and rail members 232 after the operation of cutting apparatus 238. Preferably, the cutting apparatus includes reciprocating blades oriented at an angle of approximately 60 degrees to 70 degrees with respect to length of the rail members 232, because the rail members 232 are less likely to deflect laterally when cut from this angle than when cut at a 90 degrees angle. The rail member preferably is cut an intervals of approximately 0.1 to 3.0 mm (0.004 to 0.118 in) along the length of the rail member.

The cut portions of the rail members form discrete, closely spaced hooking stems 216 projecting from the base sheet 212. To separate the hooking stems, the base sheet 212 is longitudinally stretched at a stretch ratio of at least 2 to 1, and preferably at a stretch ratio of about 4 to 1, to provide spaces between adjacent hooking stems. The stretching process preferably separates adjacent hooking stems by at least 0.50 mm (0.02 in), and more preferably by at least 1.1 to 2.8 mm (0.45 to 0.11 in) for engagement with a durable loop material. The base sheet is stretched between a first pair of nip rollers 233 and 235 and a second pair of nip rollers 237 and 239, and the two pairs of nip rollers are driven at different surface speeds. Roller 233 is heated to heat the base sheet 212 prior to stretching, and the roller 237 is chilled to stabilize the base sheet 212 after stretching.

In a variation of the foregoing process, the extruded base sheet includes rail members that do not include a top overhanging portion. When the rail members are cut and the base sheet stretched, the individual stems may then be heated to form heads atop each stem. In this manner, the heads of the hooking stems are post-formed, rather than extruded integrally with the rail members.

Abrasive sheet 200 and base sheet 212 are bonded together to form the abrasive article of the invention by using, for example, an adhesive applied to one or both of the sheets at 240 and 240'. The adhesive may comprise, for example, acrylic pressure sensitive adhesive, rubber-based PSA, waterborne lattices, solvent-based adhesives, and two-part resins (e.g. epoxies, polyesters, or polyurethanes). Other bonding means may also be used, including but not limited to heating the base sheet 212 to facilitate adhesion between the base sheet and the abrasive sheet 200, or corona treating either or both of the abrasive sheet 200 or the base sheet 212 to enable reciprocal bonding. The base sheet and the abrasive sheet may be laminated together using pressure (at a nip roller, for example) to form the abrasive article. It should be noted that the hooking stems could instead be directly coated onto a substrate, such as a polymeric film or paper, following the stretching process, and the substrate subsequently laminated to the abrasive sheet member in the same manner as described. Following lamination, the abrasive sheet material may be conveyed to a converting station such as that described above with reference to FIG. 5 for further processing.

Figure 7:
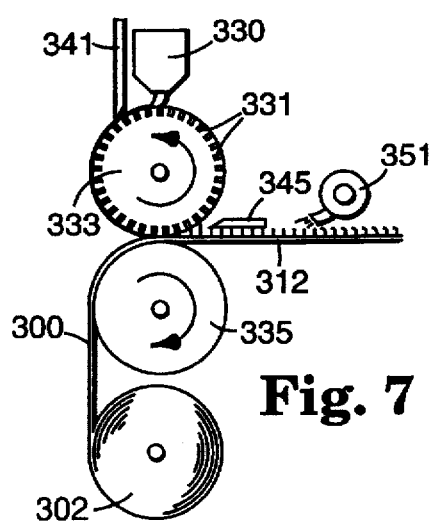
FIG. 7 is a schematic illustration of a third apparatus and process for carrying out the method of the present invention.

The apparatus and process illustrated in FIG. 7 is also suitable for use with the method of the present invention. The general operation of the process is similar to embodiments described with reference to FIGS. 5 and 6 above, with the following exceptions. The base sheet 312 is provided by a process such as that disclosed in U.S. Pat. No. 5,058,247 (Thomas et al.), the contents of which is incorporated by reference herein. As shown in FIG. 7, the hooking stems 316 are coated directly onto the abrasive sheet member 300 using a modified gravure printing process. It should be noted that the hooking stems could instead be coated onto a substrate, such as a polymeric film or paper, and the substrate previously or subsequently laminated to the abrasive sheet member 300 in the same manner as described.

The abrasive sheet member 300 is provided, preferably in the form of roll 302, and is passed through a nip formed between a print roll 333 (which acts as the mold) and an opposed roll 335. Print roll 333 includes cavities 331. Print roll 333 is heated to a temperature sufficient to prevent solidification of the flowable material in the cavities of the print roll 333. For example, a print roll temperature of between 150° to 200° C. (300° to 390° F.) is believed to be suitable for many hot-melt thermoplastics. The opposed roll 335 is preferably more compliant and resilient than the print roll 333, to cushion the flowable material as it is deposited on the coated abrasive member 300. The rolls 333 and 335 have mutually parallel central axes that are parallel to the plane of the abrasive sheet member 300. The rolls 333 and 335 are rotated about the respective central axes and have generally equal surface velocities, in both magnitude and direction, at the nip point. The velocities of the respective rolls may be different, if desired.

Flowable material is extruded or otherwise applied to print roll 333 by extruder 330. A doctor blade 341 in contact with the print roll 333 may be provided, to insure an even coating of all the cavities 331 in print roll 333 and to minimize the amount of flowable material on the print roll between the cavities. By coating the flowable material, such as a hot-melt thermoplastic material, onto the rolls 333 and 335, and by rotating the rolls as shown, the flowable material may be deposited from the print roll 333 onto the abrasive sheet member 300. The cavities 331 of the print roll 333 deposit the flowable material onto the abrasive sheet to form hooking stems in a desired pattern. The shape of the cavities in the print roll 333 may be of any suitable shape for forming a stem. For example, the cavities may be cylindrical, with a depth equal to approximately 50% to 70% of the diameter of the cavity.

As the print roll 333 and the abrasive backing separate downline of the nip, the flowable material typical extends between the print roll 333 and the abrasive backing 300 in a thread-like form, and a severing apparatus 345 (such as a hot wire, a laser, or knife) is used to sever the flowable material thread. One suitable severing apparatus comprises a nickel-chromium wire having a diameter of about 0.51 mm (0.02 in) heated to a temperature of between 343° to 416° C. (650° to 781° F.). The molten portion of the thread connected to the abrasive sheet member 300 tends to wilt under appropriate conditions, thus forming a hooking stem having an included distal end angle of less than approximately 90 degrees, as shown in FIGS. 3(a), 3(b), 3(c), and 3(d). An air stream 351 can be used to orient the direction the hooking stem either in a predetermined direction, or in a random direction. If air is directed against the hooking stems in different directions, the hooking stems may tend to become randomly oriented, which is desirable for increasing the engagement force between the abrasive article and an opposed surface. Following orientation of the hooking stems, the abrasive sheet material may be conveyed to a converting station such as that described-above with reference to FIG. 5 for further processing.

Other methods of providing stems and hooking portions are also contemplated, including the methods described in U.S. Pat. Nos. 4,454,183 (Wollman), and 5,100,400 (Mody et al.), the contents of which is incorporated herein by reference. Each of these patents generally discloses headed stems in a woven backing, which backing in the context of the present invention could be applied to an abrasive sheet in the manner described herein.

Abrasive sheet members of the foregoing construction may be attached to surfaces (such as a backup pad) having fibers, filaments, such as brushed nylon, brushed polyester, woven and nonwoven fabrics, knitted fabric, and stitch-bonded fabrics. Other applications are also contemplated, such as attachment to foam (particularly open cell foam) or to a compatible set of hooking stems.

The present invention will be further described with reference to the following Examples, which is intended to be illustrative rather than limiting.

EXAMPLE 1

An abrasive article incorporating a fastener system was made as follows, with the hooking stems being fabricated generally in accordance with the teachings of U.S. Pat. No. 5,077,870 (Melbye et al.), the contents of which is incorporated by reference herein, using an apparatus and process such as that shown in FIG. 5. The mold was a steel mold having a cylindrical peripheral surface, and included a plurality of frusto-pyramidal-type cavities drilled therein. The cavities were drilled using a bit having a tip width of 0.15 mm (0.006 in) in the manner described in Melbye et al. to form a cavity that would facilitate release of the material molded therein. Each frusto-pyramidal-type cavity had a base diameter of approximately 0.61 mm (0.024 in) at the mold surface, tapered to a diameter of 0.36 mm (0.014 in) at a point 0.07 mm (0.00275 in) below the mold surface, and tapered to a diameter of 0.23 mm (0.009 in) at the deepest point of the cavity, which was 0.76 mm (0.03 in) below the mold surface. The bottom portion of each cavity was open, to permit a vacuum force applied through the center of the mold to draw material into the mold cavities.

The cavities were formed at a density ranging from approximately 50 cavities per square centimeter to approximately 90 cavities per square centimeter in a cavity array area measuring 50 mm by 60 mm (1.97 in by 2.36 in). The cavity array area was repeated over the outer cylindrical surface of the 25.4 cm (10 in) diameter cylindrical mold, such that the mold surface was substantially covered with adjacent cavity arrays measuring 50 mm by 60 mm.

A vacuum force of approximately 45 mm (1.77 in) of mercury was applied through the mold to draw material into the cavities. The mold was cooled internally with water at 35° C. (95° F.). A random polypropylene/polyethylene copolymer (4% polyethylene) of the type available from the Shell Oil Company of Houston, Tex. under the designation WRS6-165 was prepared by heating the copolymer to a temperature of approximately 235° C. (455° F.). The copolymer was extruded onto the mold surface and into the cavities. A layer of copolymer resin was allowed to form over the mold surface to provide a base sheet, and the thickness of the base sheet ranged from approximately 0.14 to 0.18 mm (0.0055 to 0.007 in). The base sheet wrapped around approximately 75% of the cylindrical periphery of the mold, and the line speed was approximately 7.5 meters per minute (25 feet per minute). The solidified resin was stripped from the mold as a web having stems projecting from the base sheet.

The base sheet with stems was twice passed through a nip of two stacked calender rolls at a line speed of approximately 3.0 meters per minute (10 feet per minute) with the top roll maintained at a temperature of approximately 140° C. (284° F.). The first pass was made with a gap between the calender rollers of 0.71 mm (0.028 in) and the second pass at a gap of 0.55 mm (0.022 in). The headed hooking stems produced in this manner had a height of 0.5 mm above the base sheet, and had a head overhanging the hooking stem by between 0.15 to 0.2 mm (0.006 to 0.008 in). The hooking stems generally resembled those the embodiment illustrated in FIG. 2(b).

The web of headed hooking stems was laminated to the back surface of a 15.24 cm (6.0 in) diameter abrasive disc of the type available from the Minnesota Mining and Manufacturing Company of St. Paul, Minn., under the designation 3M 255L Stikit™ Film abrasive (P-180) using polyacrylate pressure sensitive adhesive (PSA). After the stem web contacted the PSA surface of the abrasive disc, a small rubber roller was used to facilitate adhesion therebetween. The abrasive article was then passed through a pair of rollers providing a nip pressure of approximately 60 newtons per square centimeter. The resultant abrasive discs were tested in conjunction with a back-up pad having a durable textile loop material of the type available from Guilford Mills, Inc., of Greensboro, N.C. under the designation 19037, and were found to perform satisfactorily.

EXAMPLE 2

An abrasive article incorporating a fastener system was made as follows, with the hooking stems being fabricated generally in accordance with the teachings of U.S. Pat. No. 4,894,060 (Nestegard), using an apparatus and process such as that shown in FIG. 6. An extrusion die was provided, and included a die opening adapted to form a rail fastener member having a base sheet and a plurality of rails projecting therefrom. The rails measured 1.27 mm (0.05 in) high, 0.76 mm (0.03 in) wide at the head portion of the rail, and were spaced at approximately 2.0 mm (0.08 in) on center. The cross-sectional profile of the rail members generally resembled the stem design shown in FIG. 2(f). The thickness of the base sheet was approximately 0.2 mm (0.008 in).

A random polypropylene copolymer available from Shell Oil Company of Houston, Tex. under the designation SRD6-321 was heated to a temperature of approximately 230° C. (446° F.) and was extruded by a 30 mm (1.2 in) extruder of the type available from Haake Incorporated of Paramus, N.J., under the designation. The extruder operated at a screw speed of approximately 50 revolutions per minute to produce an output speed from the die of about 3.0 meters per minute (10.0 feet per minute) through the die opening to form the rail fastener member. The rail fastener member so formed was quenched in water at room temperature for approximately 60 seconds to promote solidification of the rail members and base sheet.

The rail members were cut transversely using a high speed rotary blade, drawn over a roll, heated to a temperature of approximately 149° C. (300° F.), and stretched at a stretch ratio of approximately 2:1 to form a multitude of discrete hooking members of the shape illustrated in FIG. 2(f). The resultant headed hooking stems were 0.7 mm (0.028 in) high (measured relative to the base sheet), and were separated from hooking stems formed from the same rail by 0.5 mm (0.02 in), and from hooking stems formed from adjacent rails by 0.76 mm (0.03 in). The width of the head atop each hooking stem was 0.76 mm (0.03 in), and the base sheet was 0.08 mm (0.003 in) thick.

The hooking stem base sheet was laminated to the back surface of a 15.24 cm (6.0 in) diameter abrasive disc of the type available from the Minnesota Mining and Manufacturing Company of St. Paul, Minn., under the designation 3M 255L Stikit™ Film abrasive (P-180) using polyacrylate pressure sensitive adhesive (PSA). After the base sheet contacted the PSA surface of the abrasive disc, a small rubber roller was used to facilitate adhesion of the strips to the abrasive discs. The abrasive article was then passed through a pair of rollers providing a nip pressure of approximately 60 newtons per square centimeter (80 pounds per square inch).

The resultant abrasive discs were tested in conjunction with a back-up pad having a durable textile loop material of the type available from Guilford Mills, Inc., of Greensboro, N.C. under the designation 19037. The force required to disengage the abrasive article from the back-up pad so great that the abrasive disc and hooking stems were severely damaged when the abrasive article was removed from the back-up pad. It is believed that a different hooking stem design, or a different material, would yield an abrasive article having suitable release characteristics.

EXAMPLE 3

An abrasive article incorporating a fastener system was made as follows, with the hooking stems being fabricated generally in accordance with the teachings of U.S. Pat. No. 5,058,247 (Thomas et al.), the contents of which is incorporated herein by reference, using an apparatus and process such as that shown in FIG. 7. The mold used to form the hooking stems was a gravure roll. The surface of the gravure roll included a plurality of frustoconical cavities, with a diameter at the roll periphery of 1.0 mm (0.04 in) and a depth of about 0.5 mm (0.20 in). The grid density was about 50 cavities per square centimeter (325 cavities per square inch).

A polyester hot-melt adhesive of the type available from Bostik Company of Middleton, Mass. under the designation 7199 was extruded onto the gravure roll at a melt temperature of approximately 220° C. (428° F.). The gravure roll was maintained at a temperature of approximately 180° C. (356° F.) during coating. A 0.02 mm (0.0009 in) thick polyester web made internally by the Minnesota Mining and Manufacturing Company, similar to that sold by Imperial Chemical Industries Americas, Inc., of Wilmington, Del. under the designation Type S, was conveyed adjacent the gravure roll, such that the gravure roll printed the hot-melt adhesive onto the polyester web. The surface speed of the gravure roll at the printing interface was approximately 3 to 4 meters per second (10 to 14 feet per minute).

As the polyester web separated from the gravure roll, the molten polyester adhesive was suspended between each of the cavities and the web, and was severed by a heated wire made of an alloy of nickel, iron, and chromium. The position of the heated wire should allow for the formation of the desired hooking stem shape. The exact location of the heated wire depends on the operating process parameters and environmental conditions. Typically, the hot wire is disposed approximately 14 to 22 mm (0.56 to 0.88 in) from the nip point in the machine direction, and approximately 4.8 to 7.9 mm (0.19 to 0.31 in) radially outward of the backing roll, and approximately 1.5 to 4.8 mm (0.06 to 0.19 in) radially outwardly from the print roll.

The severed stems wilted to form a hooking stem, and were oriented by directing a stream of air against the stems in the cross-web direction. The hooking stems so formed were similar to those illustrated in FIG. 3(a). The hooking stems had a height of about 0.6 mm (0.024 in) measured from the base sheet.

The hook printed polyester film was subsequently coated with a hot-melt pressure sensitive adhesive, and was slit to form a headed stem strip with a width of approximately 19 mm (0.75 in). The headed stem strip was laminated to the back surface of a 15.24 cm (6.0 in) diameter abrasive disc of the type available from the Minnesota Mining and Manufacturing Company of St. Paul, Minn., under the designation 3M 255L Stikit™ Film abrasive (P-180), which included a layer of polyacrylate pressure sensitive adhesive. Because the hooking stems were directional (i.e. were oriented in the same general direction) the hooking stems of each strip faced the opposite direction of each adjacent strip. That is, the hooking stems of each strip were oriented at approximately a 180 degree angle with respect to the orientation of the hooking stems of each adjacent strip. This alternate orientation was done to reduce or prevent the disc from shifting, or walking, with respect to the back-up pad.

After the hooking stem base sheet contacted the PSA surface of the abrasive disc, a small rubber roller was used to facilitate adhesion of the strips to the abrasive discs. The abrasive article was then passed through a pair of rollers providing a nip pressure of approximately 60 newtons per square centimeter. The resultant abrasive discs were tested in conjunction with a back-up pad having a durable textile loop material of the type available from Guilford Mills, Inc., of Greensboro, N.C. under the designation 19037, and were found to perform satisfactorily.

The benefits of the inventive method are manifold. For example, the process and apparatus are relatively simple to operate at relatively high speed, yield a relatively low cost abrasive attachment system, provide for an easy conversion to discrete disc form, and provide the potential for low solvent emission.

The present invention has now been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

We claim:

1. A method of making an abrasive article, comprising the steps of:
   a) providing an abrasive sheet having first and second major surfaces, the first major surface including means for abrading a surface;
   b) applying a plurality of hooking stems to a first major surface of a base sheet by the application of a flowable polymeric organic material with a gravure roll;
   c) shaping each hooking stem so as to have an included distal end angle of less than approximately 90 degrees to thereby provide each stem with a hooking portion to enable the hooking stem to releasably hook an opposed engaging structure;
   d) bonding a second major surface of the base sheet to the second major surface of the abrasive sheet; and
   e) orienting the hooking stems such that individual hooking stems are oriented in at least two directions, respectively.

2. The method of claim 1, wherein the hooking stems are shaped in step c) by heating the stems.

3. The method of claim 1, wherein step d) precedes step c).

4. The method of claim 1, wherein the hooking stem has a length of between approximately 0.05 to 2.6 millimeters.

5. The method of claim 4, wherein the hooking stem has a length of between approximately 0.13 to 1.0 millimeters.

6. The method of claim 1, wherein the organic polymeric material comprises a thermoplastic material.

7. The method of claim 1, wherein the organic polymeric material is a thermosetting material.

8. The method of claim 1, wherein the polymeric material further comprises an additive selected from the group consisting of fillers, fibers, antistatic agents, lubricants, wetting agents, surfactants, pigments, dyes, coupling agents, plasticizers, and suspending agents.

9. The method of claim 6, wherein the thermoplastic material is selected from the group consisting of polyurethanes, polyamides, polyolefins, polyesters, and combinations thereof.

10. The method of claim 6, wherein the thermoplastic material is a polyolefin selected from the group consisting of polyethylene and polypropylene.

11. The method of claim 6, wherein the hooking stems each have a cross sectional shape, taken generally parallel to the substrate, that is selected from the group consisting of a circle, an oval, a polygon, and a multi-lobed shape.

12. The method of claim 1, wherein the stems are solid.

13. The method of claim 1, wherein the stems are hollow.

14. The method of claim 1, wherein the abrasive article includes between approximately 8 to approximately 310 hooking stems per square centimeter.

15. The method of claim 1, wherein the hooking stems are present in a uniform array on the second surface of the substrate.

16. The method of claim 11, wherein the abrasive article is a circular disc.

17. The method of claim 1, wherein the abrasive article has a shape selected from the group consisting of a polygon and a multi-lobed shape.

18. The method of claim 1, wherein step d) comprises bonding the base sheet to the second surface of the substrate with a laminating adhesive.

19. The method of claim 1, wherein the base sheet and the hooking stems comprise the same material.

20. The method of claim 1, wherein the base sheet and the hooking stems comprise different materials.

21. The method of claim 1, wherein the base sheet comprises a thermoplastic polymer.

22. The method of claim 1, wherein the plurality of hooking stems are applied to the first major surface of the base sheet in a plurality of clusters, wherein each cluster comprises at least two hooking stems, and each cluster is separated from each adjacent cluster by a distance greater than the distance between the hooking stems within a cluster.

23. The method of claim 1, wherein step b) comprises:
   i) applying an organic polymeric material in a flowable state to a gravure roll so as to fill cavities present on the surface of the gravure roll; and
   ii) contacting the gravure roll against the first surface of the base sheet so as to transfer the organic polymeric material to the substrate to thereby form the hooking stem.

24. The method of claim 23, wherein step b) comprises the further step prior to step ii) of contacting a doctor blade against the surface of the gravure roll so as to minimize the amount of organic polymeric material on the surface of the gravure roll between the cavities.

25. The method of claim 23, wherein step i) comprises extruding the organic polymeric material onto the surface of the gravure roll.

26. The method of claim 23, comprising the further step subsequent to step ii) of severing the organic polymeric material between the base sheet and the gravure roll.

27. The method of claim 1, wherein step e) comprises:
   i) applying a first plurality of hooking stems to a first base sheet;
   ii) applying a second plurality of hooking stems to a second base sheet;
   iii) bonding the first and second base sheets to the second major surface of the abrasive sheet such that the first plurality of hooking stems are oriented in a first direction and the second plurality of hooking stems are oriented in a second direction.

28. The method of claim 27, wherein the second direction is 180 degrees relative to the first direction.

29. The method of claim 27, wherein the first and second base sheets are cut from a single, continuous base sheet.

30. The method of claim 1, wherein step e) comprises directing an air stream to the hooking stems to orient the hooking stems.

31. The method of claim 30, wherein step e) comprises applying an air stream to the hooking stems to impart random orientations to the hooking stems.

32. The method of claim 1, wherein step c) comprises allowing the hooking stem to wilt while it is in at least a partially molten state.

* * * * *

UNITED STATES PATENT AND TRADEMARK OFFICE
CERTIFICATE OF CORRECTION

PATENT NO. : 5,672,186
DATED : September 30, 1997
INVENTOR(S) : Jason A. Chesley, Donald R. Bell, Harold E. Rude, William F. Sheffield, David F. Slama, and Alan N. Stephens It is certified that error appears in the above-identified patent and that said Letters Patent is hereby corrected as shown below:

Column 16,
Line 7, "claim 11" should read --claim 1 --.

Signed and Sealed this

Thirty-first Day of July, 2001

NICHOLAS P. GODICI
Acting Director of the United States Patent and Trademark Office